United States Patent [19]

Dickey

[11] 4,040,547
[45] Aug. 9, 1977

[54] APPARATUS FOR HOLDING A MICROPHONE

[76] Inventor: Ralph E. Dickey, 821 North Walnut, Box 267, Medicine Lodge, Kans. 67104

[21] Appl. No.: 662,411

[22] Filed: Mar. 1, 1976

[51] Int. Cl.² ............................................. A45F 5/02
[52] U.S. Cl. .................................. 224/5 H; 179/157; 248/229; 224/5 E
[58] Field of Search ............ 179/157, 107 R, 107 FD; 248/229; 224/5 R, 5 A, 5 B, 5 C, 5 E, 5 H, 5 S, 5 V, 5 W, 5 Y, 5.1, 26 R, 26 B, 26 D, 26 H, 26 K, 25 R, 1 R, 2 C, 4 A

[56] References Cited

U.S. PATENT DOCUMENTS

| | | | |
|---|---|---|---|
| 1,403,707 | 1/1922 | Quarnstrom | 224/5 H UX |
| 2,861,854 | 11/1958 | Best | 224/5 R UX |
| 2,924,364 | 2/1960 | Raguse | 224/4 A |
| 2,985,349 | 5/1961 | McGuire | 224/5 A |
| 3,312,435 | 4/1967 | Malone | 224/4 A X |
| 3,370,236 | 2/1968 | Walker | 224/5 H UX |

Primary Examiner—Robert J. Spar
Assistant Examiner—Jerold M. Forsberg
Attorney, Agent, or Firm—John H. Widdowson; Edwin H. Crabtree

[57] ABSTRACT

An apparatus for holding a microphone. The microphone is engagably received on an adjustable base which is clipped to an article of clothing worn by a user of the microphone. By adjusting the base, the sound receiving portion of the microphone can be positioned toward the direction of sound.

1 Claim, 3 Drawing Figures

APPARATUS FOR HOLDING A MICROPHONE

BACKGROUND OF THE INVENTION

This invention relates generally to microphone accessories and more particularly but not by way of limitation to an apparatus for holding a microphone.

Heretofore there have been various types of carriers for holding telephones, flash lights, microphones, tape recording devices, and the like. These carriers are used for holding the various instruments adjacent a person's body while being supported thereon. The prior art carriers have not included means for clipping the carrier to the user's clothing in combination with a microphone clip for releasably engaging the microphone which can be adjusted so that the sound receiving portion of the microphone is directed toward the source of sound.

The subject invention as disclosed herein comprises a novel structure for holding a microphone.

SUMMARY OF THE INVENTION

The subject invention provides an apparatus for holding a microphone clipped to the user's clothing thereby freeing the hands of the user for taking sound movies with a camera.

The apparatus for holding a microphone allows the microphone to be engagably received on a base. The base can be adjusted in a direction toward the source of sound. The invention may be clipped to the user's belt, shirt, coat pocket, pant pocket, or any other convenient article of clothing for holding the microphone.

The invention is simple in design, rugged in construction, lightweight, and readily adaptable for holding various types of microphones, sound receiving instruments or the like.

The apparatus for holding a microphone includes a base having a U-shaped metal clip for releasably engaging a portion of the microphone and holding the microphone on the base. The base is pivotally attached to a spring biased clip. The spring biased clip is used for releasably engaging an article of clothing worn by the user of the microphone. A threaded bolt and locking nut pivotally attach the base to the spring biased clip. By loosing the locking nut, the base and microphone can be adjusted toward the direction of sound.

The advantages and objects of the invention will become evident from the following detailed description when read in conjunction with the accompanying drawings which illustrate the preferred embodiments of the invention.

DETAILED DESCRIPTION OF THE DRAWINGS

Figure 1:
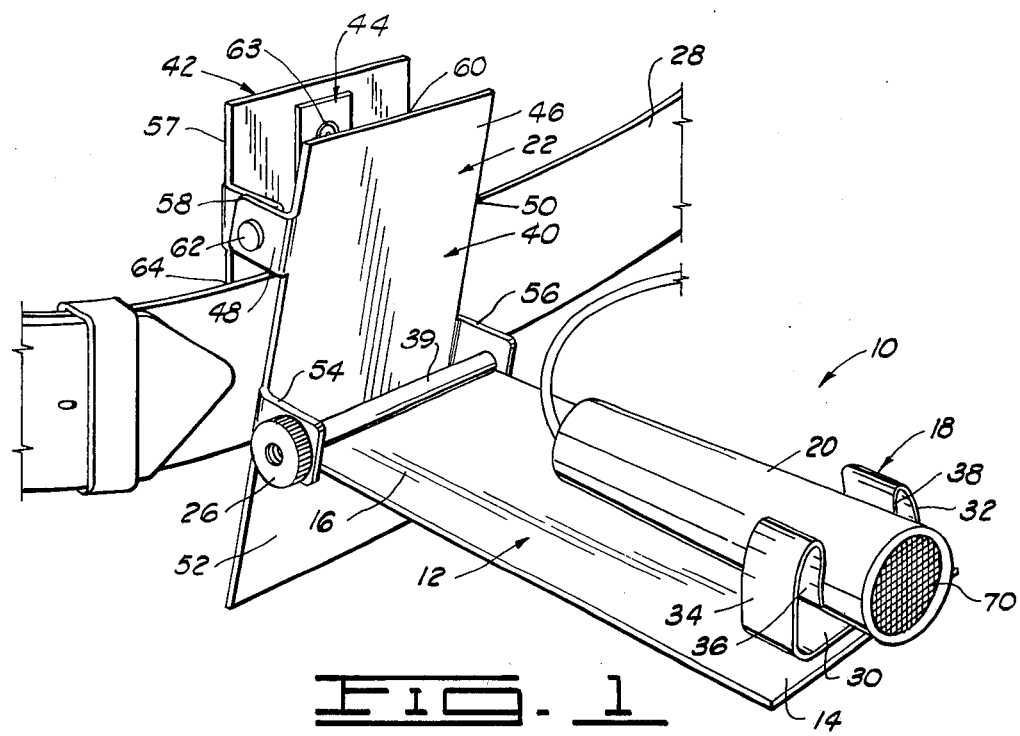
FIG. 1 is a perspective view of the apparatus for holding a microphone.

In FIG. 1 the apparatus for holding a microphone is designated by general reference numeral 10. The apparatus 10 includes a base 12 having a first end portion 14 and a second end portion 16, a U-shaped metal microphone clip 18 for engagably receiving a portion of the microphone 20, and a spring biased clip 22 pivotally attached to the second end portion 16 of the base 12 by a threaded bolt 24 which is shown in FIG. 3 and a locking nut 26.

In this illustration the spring biased clip 22 is shown attached to a belt 28 of the user of the microphone 20. It should be recognized while the clip 22 is shown attached to the belt 28, the clip 22 could also be attached to a shirt pocket, coat pocket, or any other article of clothing.

Figure 2:
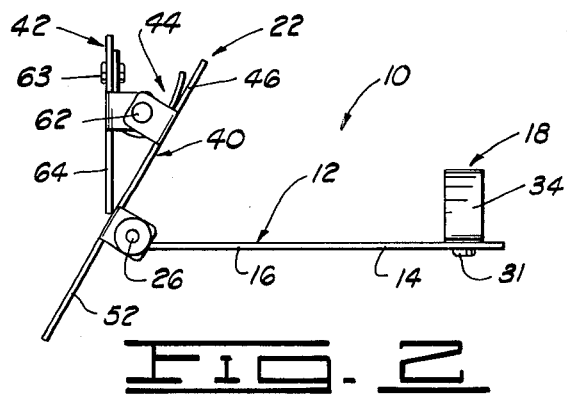
FIG. 2 is a side view of the apparatus for holding a microphone.
Figure 3:
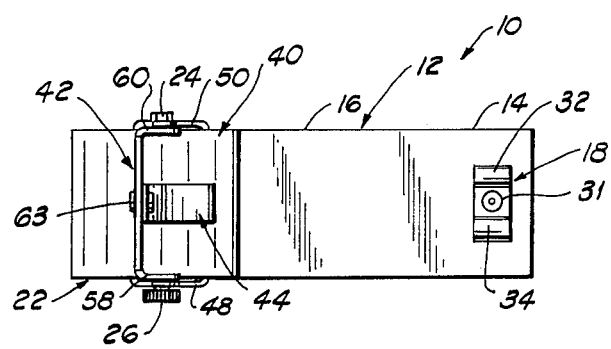
FIG. 3 is a top view of the apparatus for holding a microphone.

The metal clip 18 includes a bottom portion 30 which is secured to the first end portion 14 of the base 12 by a pop rivet 31 shown in FIGS. 2 and 3. Side portions 32 and 34 of the clip 18 extend upwardly from the bottom portion 30. An upper portion 36 and 38 of the two side portions 32 and 34 are folded over and positioned facing each other. The space between the upper portions 36 and 38 is smaller than the diameter of the microphone 20, therefore when the microphone 20 is received therein, the upper portions 36 and 38 are pushed outwardly biasing a portion of the microphone 20 therebetween.

The end of the second end portion 16 of the base 12 is folded into a hollow cylindrical portion 39 for receiving the threaded bolt 24 therethrough.

The spring based clip 22 includes a first member 40, a second member 42, and a metal leaf spring 44. The first member 40 includes an upper portion 46 having a pair of ears 48 and 50 integrally formed therein and extending rearwardly from the opposite sides of the upper portion 46. The first member 40 further includes a lower portion 52 also having a pair of ears 54 and 56 integrally formed therein and extending outwardly from the opposite sides of the lower portion 52 and toward the base 12.

The hollow cylindrical portion 39 of the base 12 is received between the ears 54 and 56 of the first member 40 and adjacent thereto. The ears 54 and 56 include apertures therein which are not shown in the drawings and are for receiving the threaded bolt 24 therethrough.

The second member 42 of the clip 22 includes an upper portion 57 having a pair of ears 58 and 60 integrally formed therein and extending outwardly from the opposite sides of the upper portion 57 and pivotally pinned by pop rivets 62 to the ears 48 and 50 of the first member 40.

The leaf spring 44 is U-shaped with one end attached to the upper portion 57 of the member 42 by a pop rivet 63. The other end of the leaf spring 44 is biased against the upper portion 46 of the first member 40 thereby urging a lower portion 64 of the second member 42 toward the lower portion 52 of the first member 46.

In FIGS. 2 and 3 the microphone 20 has been removed from the microphone clip 18 so that a side view and top view of the apparatus 10 may be shown. Also in these two views the apparatus 10 has been removed from the belt 28 and the spring biased clip 22 can be seen with leaf spring 44 biasing the lower portion 64 of the second member 42 against the sides of the lower portion 52 of the first member 40.

In operation the user of the apparatus 10 may clip the apparatus to an article of clothing with the spring biased clip 22. The microphone 20 is engagably received in the U-shaped metal microphone clip 18 with a sound receiving portion 70 of the microphone 20 extending outwardly from the apparatus 10.

The base 12 and microphone 20 can now be adjusted upwardly, downwardly or at any angle from the user so that the sound receiving end portion 70 of the microphone 20 can be directed toward the source of sound. When the base 12 and the microphone 20 are adjusted, the user of the microphone 20 now has both hands free to use in handling a camera, spotlight, monitor, or any other equipment used in conjunction with the microphone 20.

The base 12 is adjusted and held in place by loosing the lock nut 28 on the bolt 24 and pivoting the hollow cylindrical portion 39 about the bolt 24. The base 12 is held in place by screwing the lock nut 26 on the bolt 24 thereby compressing the ears 54 and 56 of the clip 22 between the locking nut 26, the hollow cylindrical portion 39, and the bolt 24.

Changes may be made in the construction and arrangement of the parts or elements of the embodiments as disclosed herein without departing from the spirit or scope of the invention as defined in the following claims.

I claim:

1. An apparatus for holding a microphone, the apparatus comprising:
    a flat angular shaped base having a first end portion and a second end portion, the second end portion of said base folded into a hollow cylindrical portion;
    a U-shaped clip, said clip having a bottom portion secured to the top of the first end portion of said base, and side portions extending upwardly from the bottom portion, the ends of the side portions folded over and positioned facing each other, the space between the side portions being smaller than the diameter of the microphone so the microphone may be received therebetween and retained in a press fit;
    a spring biased clip for releasably engaging an article of clothing worn by the user of the microphone, said spring biased clip including;
        a first member having an upper portion with a pair of ears extending rearwardly from the opposite sides of the upper portion, and a lower portion having a pair of ears extending outwardly from the opposite sides of the lower portion and having apertures therein,
        a second member having an upper portion with a pair of ears extending outwardly from the opposite sides of the upper portion, the ears pivotally attached to the ears of the upper portion of the first member.
        a U-shaped leaf spring, one end of the leaf spring attached to the upper portion of the second member, the other end of the leaf spring biased against the upper portion of the first member; and
    a threaded bolt slidably received through the hollow cylinder portion of the second end portion of said base and slidably received through the apertures in the ears of the lower portion of the first member of said spring biased clip for receiving a locking nut, whereby by loosening said locking nut on said bolt, said base and microphone may be pivoted relative to said spring biased clip and locked again in a desired angular orientation.

* * * * *